(12) United States Patent
Polak et al.

(10) Patent No.: US 10,614,310 B2
(45) Date of Patent: Apr. 7, 2020

(54) BEHAVIOR RECOGNITION

(71) Applicant: Viisights Solutions Ltd., Tel-Aviv (IL)

(72) Inventors: Simon Polak, Tel-Aviv (IL); Menashe Rothschild, Tel-Aviv (IL); Asaf Birenzvieg, Hod-HaSharon (IL)

(73) Assignee: Viisights Solutions Ltd., Tel-Aviv (IL)

( * ) Notice: Subject to any disclaimer, the term of this patent is extended or adjusted under 35 U.S.C. 154(b) by 76 days.

(21) Appl. No.: 16/116,968

(22) Filed: Aug. 30, 2018

(65) Prior Publication Data

US 2019/0294881 A1 Sep. 26, 2019

Related U.S. Application Data

(60) Provisional application No. 62/646,400, filed on Mar. 22, 2018.

(51) Int. Cl.
*G06K 9/00* (2006.01)
*G06N 3/08* (2006.01)
*G06N 3/04* (2006.01)
*G06K 9/72* (2006.01)
*G06K 9/62* (2006.01)
*G06F 16/71* (2019.01)
*G06F 3/00* (2006.01)

(52) U.S. Cl.
CPC ......... *G06K 9/00718* (2013.01); *G06F 16/71* (2019.01); *G06K 9/00744* (2013.01); *G06K 9/6256* (2013.01); *G06K 9/6277* (2013.01); *G06K 9/726* (2013.01); *G06N 3/04* (2013.01); *G06N 3/0445* (2013.01); *G06N 3/0454* (2013.01); *G06N 3/08* (2013.01); *G06K 2009/00738* (2013.01)

(58) Field of Classification Search
CPC .................................... G06K 9/00; G06F 3/00
USPC ........................................................ 382/103
See application file for complete search history.

(56) References Cited

U.S. PATENT DOCUMENTS 9,336,456 B2 * 5/2016 DeLean ............. G06K 9/00335

* cited by examiner

*Primary Examiner* — Abolfazl Tabatabai

(57) ABSTRACT

A computer implemented method of identifying a behavior of objects detected in a video stream, comprising using one or more processors adapted for receiving a video stream comprising a plurality of frames captured by imaging sensor(s), applying a first set of trained classification functions for visually analyzing each of at least a subset of the frames to create a semantic attribute set for each object detected in each frame comprising an object probability score indicative of the object class probability, attribute probability score(s) indicative of probability of attribute(s) associated with the object and estimated location of the object, applying a second set of trained classification functions for semantically analyzing the attribute sets created for each object tracked in the subset to calculate a behavior probability score indicative of action(s) estimated to be conducted by each object and outputting an indication when the calculated behavior probability score complies with predefined rule(s).

13 Claims, 8 Drawing Sheets

BEHAVIOR RECOGNITION

RELATED APPLICATIONS

This application claims the benefit of priority under 35 USC § 119(e) of U.S. Provisional Patent Application No. 62/646,400 filed on Mar. 22, 2018, the contents of which are incorporated by reference as if fully set forth herein in their entirety.

FIELD AND BACKGROUND OF THE INVENTION

The present invention, in some embodiments thereof, relates to recognizing behavior, and, more specifically, but not exclusively, to recognizing behavior of one or more objects detected in a video stream.

Recognition and classification of behavior and activity patterns of objects captured in video streams for detecting certain actions and/or events may be of great interest for a plurality of applications and has therefore attracted significant research interest in recent years.

Methods and systems for analyzing scenes captured by vision systems are constantly evolving in attempt to improve semantic inference from observed dynamics of moving targets, for example, humans, animals, vehicles and/or the like. Such methods and systems may target multiple applications ranging from surveillance through video content retrieval to human-computer interfaces.

SUMMARY OF THE INVENTION

According to a first aspect of the present invention there is provided a computer implemented method of identifying a behavior of objects detected in a video stream, comprising using one or more processors adapted for:

Receiving a video stream comprising a plurality of frames captured by one or more imaging sensors.

Applying a first set of trained classification functions for visually analyzing each of at least a subset of the plurality of frames to create a respective one of a plurality of semantic attribute sets for each of one or more objects detected in a respective frame. The respective attribute set comprising an object probability score indicative of a class of the object, an attribute probability score indicative of a probability of one or more of a plurality of attributes associated with the object and an estimated location of the object in the respective frame.

Applying a second set of trained classification functions for semantically analyzing the plurality of attribute sets created for each of the object(s) tracked in the subset of frames to calculate a behavior type probability score indicative of one or more of a plurality of actions estimated to be conducted by each of the object(s).

Outputting an indication in case the calculated behavior type probability score complies with one or more predefined rules.

The staged behavior recognition approach comprising the visual analysis and classification followed by the semantic analysis and classification is based on machine learning classification thus making it highly adjustable and adaptable to new scenarios by training it accordingly. Moreover, since the second set of classifier(s), for example, a neural network is applied to semantically analyze the semantic attribute sets, the neural network may be small and may therefore be trained very fast. The staged behavior recognition approach may be highly robust against inaccuracy, change, shift and/or degradation effects in image quality, viewpoint and/or quality of object detection since such effects may be easily modelled in the semantic domain and added as training samples. Furthermore, as it supports detection, recognition and classification of multiple concurrent actions and/or interaction events involving multiple objects in a single frame, the staged behavior recognition approach may be employed by a large range of fast and highly perceptive video analysis and behavior recognition systems.

According to a second aspect of the present invention there is provided a system for identifying a behavior of objects detected in a video stream, comprising:

A program store storing a code; and

One or more processors coupled to the program store for executing the stored code, the code comprising:

Code instructions to receive a video stream comprising a plurality of frames captured by one or more imaging sensors.

Code instructions to apply a first set of trained classification functions for visually analyzing each of at least a subset of the plurality of frames to create a respective one of a plurality of semantic attribute sets for each of one or more objects detected in a respective frame. The respective attribute set comprising an object probability score indicative of a class of the object, an attribute probability score indicative of a probability of one or more of a plurality of attributes associated with the object and an estimated location of the object in the respective frame.

Code instructions to apply a second set of trained classification functions for semantically analyzing the plurality of attribute sets created for each of the object(s) tracked in the subset of frames to calculate a behavior type probability score indicative of one or more of a plurality of actions estimated to be conducted by each of the object(s).

Code instructions to output an indication in case the calculated behavior type probability score complies with one or more predefined rules.

In a further implementation form of the first and/or second aspects, each frame of the subset is divided to a plurality fixed size cells, each of the object(s) is tracked in the subset of frames by mapping each of the plurality of attribute sets to one or more corresponding cells of the plurality fixed size cells according to the estimated location of each of the object(s) in the respective frame. Applying a grid to designate the grid cells in each frame may allow for simple and direct mapping of each object detected in the frame to its respective attribute set according to the location (cells) in which the object is detected, thus providing instant spatial mapping.

In a further implementation form of the first and/or second aspects, the one or more objects are members of a group consisting of: a human, a group of humans, an animal, a group of animals, a vehicle and a group of vehicles. Detection and classification of the diverse range of objects may allow adoption of the staged behavior recognition approach in wide range of applications, for example, security, border control, public order enforcement, emergency service, wildlife monitoring and/or the like.

In a further implementation form of the first and/or second aspects, each of the plurality of attributes associated with each of the object(s) is a member of a group consisting of: a description attribute, an action attribute and an interaction attribute. While the attributes may serve for identifying and tracking object(s) in a sequence of frames, the action and/or interaction attributes may be essential for identifying and classifying the action(s) and/or interaction event(s) estimated to be conducted by the detected object(s). It is therefore highly desirable to identify as many attributes as possible which may be associated with each object detected in the frames.

In a further implementation form of the first and/or second aspects, the plurality of actions includes one or more members of a group consisting of: a displacement of the object in space, a motion of a part of the object and a gesture articulated by the object. In order to classify the action(s) and/or event(s) to behavior type(s), actions conducted by the objects may be defined in basic action terms such as the displacement, motion and/or gesture to allow association of the basic action terms with the attributes, specifically the action and/or interaction attributes estimated for the object(s) to correctly and accurately classify the action(s) and/or event(s).

In an optional implementation form of the first and/or second aspects, the second set of trained classification functions is applied to calculate an event type probability score for at least one estimated interaction event of the one or more of the objects with one or more other objects. Identifying and classifying interaction events involving multiple objects may be of high value to a plurality of applications such as the security, border control, public order enforcement, emergency service, wildlife monitoring and/or the like.

In a further implementation form of the first and/or second aspects, the first set of trained classification functions comprises one or more convolutional neural networks (CNN) organized with hierarchical classes. Using the CNN as known in the art may significantly reduce the design, adoption, integration and/or maintenance of the first set of trained classification functions since the CNN is a proven technology having a solid development and implementation basis.

In a further implementation form of the first and/or second aspects, the second set of trained classification functions comprises one or more long short term (LSTM) recurrent neural networks (RNN). Using the LSTM RNN as known in the art may significantly reduce the design, adoption, integration and/or maintenance of the first set of trained classification functions since the LSTM RNN is a proven technology having a solid development and implementation basis.

In a further implementation form of the first and/or second aspects, the second set of trained classification functions is trained using a training dataset comprising a plurality of samples generated by the first set of trained classification functions. Each of the plurality of samples comprising a group of training attribute sets associated with a label indicating a certain one of the plurality of actions expressed by the group of training attribute sets. Training of the second set of trained classification functions is done using annotated (labeled) training attribute sets created using the classification data generated by the first set of trained classification functions applied to annotated (labeled) training frames assigned with a label indicative of the action(s) and/or event(s) and respective attributes depicted in the training frames. During training, the second set of trained classification functions is adjusted so that it may classify with a respective confidence level (probability score) object(s) and attributes detected in new (previously unseen) frames.

In an optional implementation form of the first and/or second aspects, one or more augmented samples are included in the training dataset. The augmented sample(s) is created by altering one or more element of one of the plurality of samples. The altered element(s) is a member of a group consisting of: the object probability score, the attribute probability score and the estimated location. Including augmented training samples comprising augmented training attribute sets may significantly enhance and diversify the training set used for training the second set of trained classification functions thus significantly improving the classification accuracy and confidence of correct classification. Moreover, since the second set of trained classification functions is trained with the semantic training attribute sets, augmenting such semantic samples may be easily done either manually and/or automatically because augmenting semantic data (text, numeric expressions, coordinates and/or the like) may be significantly less complex and less resource consuming compared to augmenting raw pixel data of actual video streams.

In an optional implementation form of the first and/or second aspects, one or more synthetic samples are included in the training dataset. The synthetic sample(s) is created by assigning a value to each of the elements of a group of training attribute sets created for the one or more simulated objects simulated in a group of frames used for training the second set of trained classification functions. Including augmented training samples comprising augmented training attribute sets may significantly enhance and diversify the training set used for training the second set of trained classification functions thus significantly improving the classification accuracy and confidence of correct classification. Moreover, since the second set of trained classification functions is trained with the semantic training attribute sets, creating synthetic semantic samples may be easily done either manually and/or automatically by converting scenario descriptions to semantic data (text, numeric expressions, coordinates and/or the like).

In a further implementation form of the first and/or second aspects, the value is assigned according to a distribution value indicative of a level of association of a respective element of a respective attribute set with a certain one of the plurality of actions in real world. By assigning the probability scores for the object(s) and/or attributes as well as estimating the location of the object(s) according to statistic distributions measured in the real world for similar objects and/or attributes the probability scores and/or location estimates may follow real world characteristics and may therefore be highly realistic.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
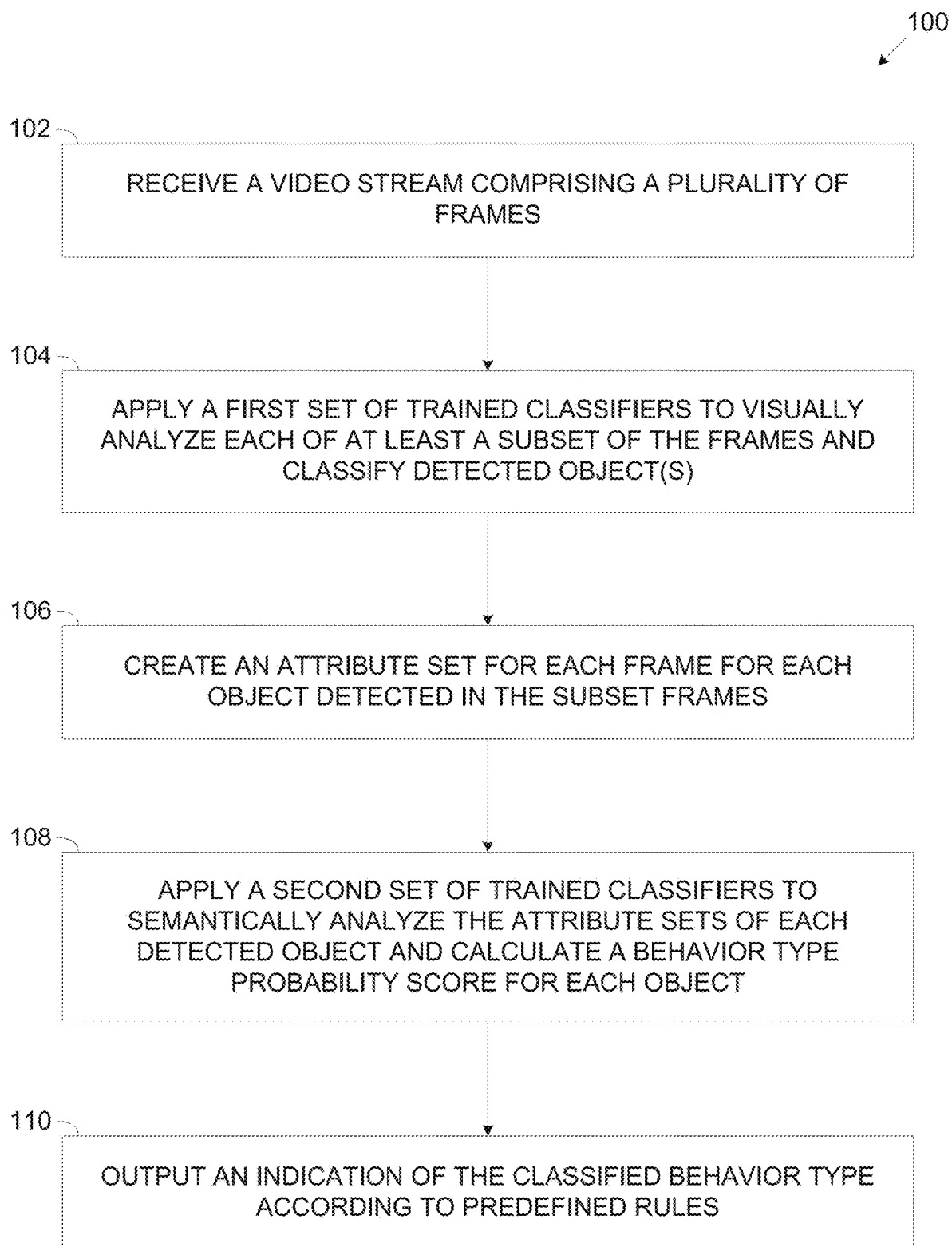
FIG. 1 is a flowchart of an exemplary process of recognizing behavior of one or more objects detected in a video stream, according to some embodiments of the present invention.

The present invention, in some embodiments thereof, relates to recognizing behavior, and, more specifically, but not exclusively, to recognizing behavior of one or more objects detected in a video stream.

According to some embodiments of the present invention, there are provided methods and systems for recognizing behavior of one or more objects, for example, a human, an animal, a vehicle and/or the like detected in a video stream captured by one or more imaging sensors by applying a staged classification approach in which trained machine learning based classification functions (classifiers) are applied to frames of the video stream in a staged sequence.

In the first stage, a first set of one or more machine learning trained classifier(s), for example, a neural network such as for example, a Convolutional Neural Network (CNN) and/or the like, specifically visual classifier(s), is applied to a plurality of frames of the video stream in order to classify one or more objects detected in the frames and further identify and classify one or more attributes associated with the detected object(s) and estimate a location in the frame of the detected object(s). The attributes may include, for example, one or more description attributes descriptive of the associated object (e.g. gender, age group, ethnic group, height, build, cloth identification, etc.), one or more action attributes indicative of an action conducted by the associated object (e.g. pose, gesture, limb(s) position, etc.), one or more interaction attributes indicative of an interaction between multiple objects (e.g. respective pose between multiple objects, contact between multiple objects, interaction gesture between multiple objects, respective limb(s) position between multiple objects, etc.) and/or the like. The first set of classifier(s) further calculates an object probability score for each classified object reflecting the probability (confidence) that the detected object is correctly classified and an attribute probability score for each identified attribute reflecting the probability (confidence) that the identified attribute is correctly classified.

The collected classification data is semantic in nature as it comprises linguistic (textual) expressions for the classes, numeric expression and/or value(s) for the probability scores and numeric coordinates for the estimated locations. The collected classification data may be therefore organized in semantic attribute sets created for each of the detected and classified objects such that each attribute set is associated with a respective object and a respective analyzed frame. Each attribute set comprising the class(es) estimated for the respective object together with the calculated object probability score(s), the class(es) of the attribute(s) associated with the respective attribute probability score(s) and the location of the respective object in the respective frame. A plurality of attribute sets may be created for each detected object tracked in at least a subset of frames of the video stream. As such the detected object(s), their associated attribute(s) and respective location is transferred from the visual domain to the semantic domain, i.e. the detected object(s), their associated attribute(s) and respective location are classified using semantics, for example, text, numeric expressions and/or values, symbols, coordinates and/or the like.

At the second stage, a second set of one or more machine learning trained classifier(s), for example, a neural network such as for example, a Long Short Term Memory (LSTM) Recurrent Neural Network (RNN) and/or the like, is applied to the plurality of semantic attribute sets of one or more of the detected objects. The second set of classifier(s) may analyze the attribute sets and may classify them to one or more behavior types (classes) according to one or more actions estimated to be conducted by the respective object detected in the analyzed frames. The actions may include, for example, a displacement of the respective object in space (in the frame), a motion of a part of the respective object, a gesture articulated by the respective object and/or the like. The second set of classifier(s) further calculates a behavior type probability score reflecting the probability (confidence) that the estimated behavior type correctly represents the respective action(s). The second set of classifier(s) may further analyze the attribute sets to classify them to one or more behavior types (classes) according to interaction event(s) estimated to be conducted by multiple object detected in the analyzed frames. Similarly, the second set of classifier(s) further calculates a behavior type probability score reflecting the probability (confidence) that the estimated behavior type(s) correctly represents the respective interaction event(s).

An indication may be generated in case the classified behavior type(s) comply with one or more predefined rules. Optionally the classified behavior type(s), action(s), event(s), objects and/or attribute(s) may also be provided with the generated indication. For example, assuming a security system is deployed with one or more cameras monitoring a certain area. In such case one or more of the predefined rules may dictate that an indication is generated in case a car theft behavior type is estimated with a behavior type probability score exceeding a certain threshold. In another example, assuming a transportation emergency service system is deployed with one or more cameras monitoring a certain street, road and/or the like. In such case one or more of the predefined rules may dictate that an indication is generated in case a car accident behavior type is estimated with a behavior type probability score exceeding a certain threshold. In another example, assuming a public order monitoring system is deployed with one or more cameras monitoring a certain area. In such case one or more of the predefined rules may dictate that an indication is generated in case a fight between people behavior type is estimated with a behavior type probability score exceeding a certain threshold. One or more of such systems may further transmit the indication, optionally with the estimated behavior and/or an indication of the classified objects, actions, events and/or the like to one or more destinations, for example, the police, a security service operation center, a medical service and/or the like. In another example, the indication may be generated to instruct storing the respective video stream and/or relevant part thereof in case the classified behavior type(s) comply with one or more of the predefined rules.

In addition to training the second set of classifier(s) using real attribute sets created based on classification data generated by the first set of classifier(s), the second set of classifier(s) may be trained with augmented training samples. The augmented training samples may be created by altering one or more elements of one or more of the semantic attribute sets comprising the classification data generated by the first set of classifiers, i.e. the object(s) class(s) with their respective object probability score(s), the attribute(s) class(s) with their respective attribute probability score(s) and the estimated location of the object(s) in the frames. Altering the semantic attribute sets elements, for example, inserting white noise is naturally done in the semantic domain and is therefore simple and requires little effort.

Furthermore, the second set of classifiers may be trained with synthetic training samples. The synthetic training samples may be created by parsing a semantic (e.g. verbal, symbolic, etc.) scenario description of one or more actions conducted by one or more simulated objects and/or of one or more events of interaction between multiple simulated objects and creating respective simulated data structures. The simulated data structures may include object(s) class(s) with their respective object probability score(s), attribute(s) class(s) with their respective attribute probability score(s) and location of the simulated object(s) in the frames. The objects, attributes and/or classification scores may be assigned to the simulated objects according to distributions calculated and/or measured in video streams depicting real world scenarios, in particular video streams depicting object(s), attribute(s), action(s) and/or event(s) similar to the simulated ones.

The staged behavior recognition approach may present significant advantages and benefits over currently existing methods for analyzing video streams to identify behavior of objects detected in the video stream.

Some of the existing systems, for example, typically referred as end-to-end video classification systems, may employ machine learning based solutions, for example, a neural network for recognizing action(s) and/or event(s) by trying to classify the entire scene portrayed by the video stream (sequence of frames) into one of a set of recognized behaviors. Such systems may present major limitations. First, since designed to recognize behavior in an end-to-end approach, such systems may not be able to localize the behavior recognition and classification to objects detected at specific segments of the frames of the video stream(s). Moreover, such systems may naturally not be able to recognize and classify multiple actions and/or events conducted concurrently by a plurality of objects detected in the video stream(s). Since these systems are trained end-to-end, using raw video streams training samples training of such systems may require feeding it a training dataset comprising extremely high number of high volume training samples thus requiring high storage and/or processing resources and extensive training time. Furthermore, due to the need to train such systems with raw video streams training samples, augmenting these training samples to increase and/or diversify the training dataset may be a complex task requiring extensive processing, storage and/or time resources. In addition, such systems may need to process the raw video stream twice, once for identifying and classifying the object(s) and attribute(s) and a second time for classifying the action or event.

Other existing systems may apply a heuristics approach which is based on a set of predefined rules rather than on machine learning. Such heuristics systems may receive its input from objects and attributes detectors together with input from a tracking mechanism. These systems recognize (classify) the action(s) and/or event(s) by analyzing this input according to the set of rules designed using human knowledge and implemented as a set of if/else conditions. For example, one of such rules for "human moving" action may be defined as follows: if a person was detected and assigned ID X and after N frames a person was detected and assigned the same ID X, and distance between the center of the first detected person bounding box and the center of the second detected person bounding box is greater than M, detect action "human moving" with the locations of person X. Such systems may also exhibit some inherent limitations. First such systems highly rely on high precision object and attributes detectors and a highly accurate tracker. Such requirements are rarely satisfied in real life situations and when the accuracy of the input is relatively low such systems may fail. Moreover, such systems employ hard-coded rules which may not be easily adjusted. Creating heuristics (rules) for each new event or action may be very time consuming and may require extensive manual effort of experts to define, design and/or code the action or event. Furthermore, since these systems do not employ machine learning techniques, they may be highly unstable and since any change and/or shift in the input data may lead to inability of the system to properly classify it according to the hard-coded rules.

The staged behavior recognition approach may address all these limitations and more. First, the staged behavior recognition approach is based on machine learning classification making it highly adjustable and adaptable to new scenarios by training it accordingly. The second set of classifier(s), for example, the LSTM RNN may automatically adjust itself during training to employ the best fit for highly accurate behavior recognition and classification. In addition, since the second set of classifier(s), for example, the LSTM RNN, is applied to semantically analyze the semantic attribute sets, it may be a very small network which may be trained very fast. Moreover, the training samples used for training the second set of classifier(s) comprises training semantic attribute sets which are very small in volume and may therefore require significantly lower storage and/or processing resources compared to the (pixel data) actual video training samples which may be used by the existing systems. Furthermore, since the second set of classifier(s) is trained with semantic training samples comprising the attribute sets, augmented training samples and/or synthetic training samples may be easily created either manually and/or automatically. This is because augmenting the semantic data (text, numeric expressions, coordinates and/or the like) may be significantly less complex and less resource consuming compared to augmenting the raw pixel data of actual video streams since the volume of the semantic data is considerably smaller and the semantic context of semantic data may be significantly simpler to comprehend, augment and/or produce. Creating the synthetic training samples may also be simply and easily done by converting scenario descriptions to semantic attributes sets comprising the semantic data (text, numeric expressions, coordinates and/or the like). Creation of the synthetic samples in the semantic domain is significantly less resource consuming compared to creating synthetic video data comprising synthetic raw pixel data.

The staged behavior recognition approach may be highly robust against inaccuracy, change, shift and/or degradation effects in image quality, viewpoint and/or quality of object detection. Such effects may be easily statistically modelled as noise in the semantic domain and added as training samples thus significantly improving robustness of staged behavior recognition based systems. Such effects are very hard to model in the raw pixel data of the video streams which may be used to train some of the existing systems, for example, the end-to-end video classification systems.

As it supports detection, recognition and classification of multiple concurrent actions and/or interaction events involving multiple objects in a single frame, the staged behavior recognition approach may be employed by a large range of fast and highly perceptive video analysis and behavior recognition systems. Such systems may typically need to produce a number of insights simultaneously, specifically object(s) type (class), object(s) locations, tracking these objects and the description of their behavior in real time or at least in near real time. By analyzing the video stream only once and transferring the context to the semantic domain and associating each of a plurality of objects with its respective location in space (in the frame), classification of the actions and/or events may be very fast thus providing high performance behavior recognition in real time and/or near real time for a plurality of actions and/or events taking place simultaneously.

As such the staged behavior recognition approach may be employed by a plurality of applications, for example, security, border control, public order enforcement, emergency service and/or the like which typically require high speed, robust, accurate and real time (or near real time) recognition, classification and indication (alert) of certain types of behaviors, actions and/or events.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of recognizing behavior of one or more objects detected in a video stream, according to some embodiments of the present invention. A process 100 may be executed for recognizing behavior of one or more objects, for example, a human, an animal, a vehicle and/or the like detected in a video stream. The process comprises first applying trained visual classification functions (classifiers) to one or more frames of the video stream for mapping attributes and location of the object(s) detected in the respective frame to create a respective semantic attribute set for each object comprising semantic description of the object, the attributes and the location of the object. The attribute sets created for each object are created for each of at least a subset of frames of the video stream in which the object(s) may be tracked. The attribute sets are then semantically analyzed using trained classification functions to estimate and/or classify one or more actions conducted by the object(s) and/or events involving multiple objects.

Figure 2:
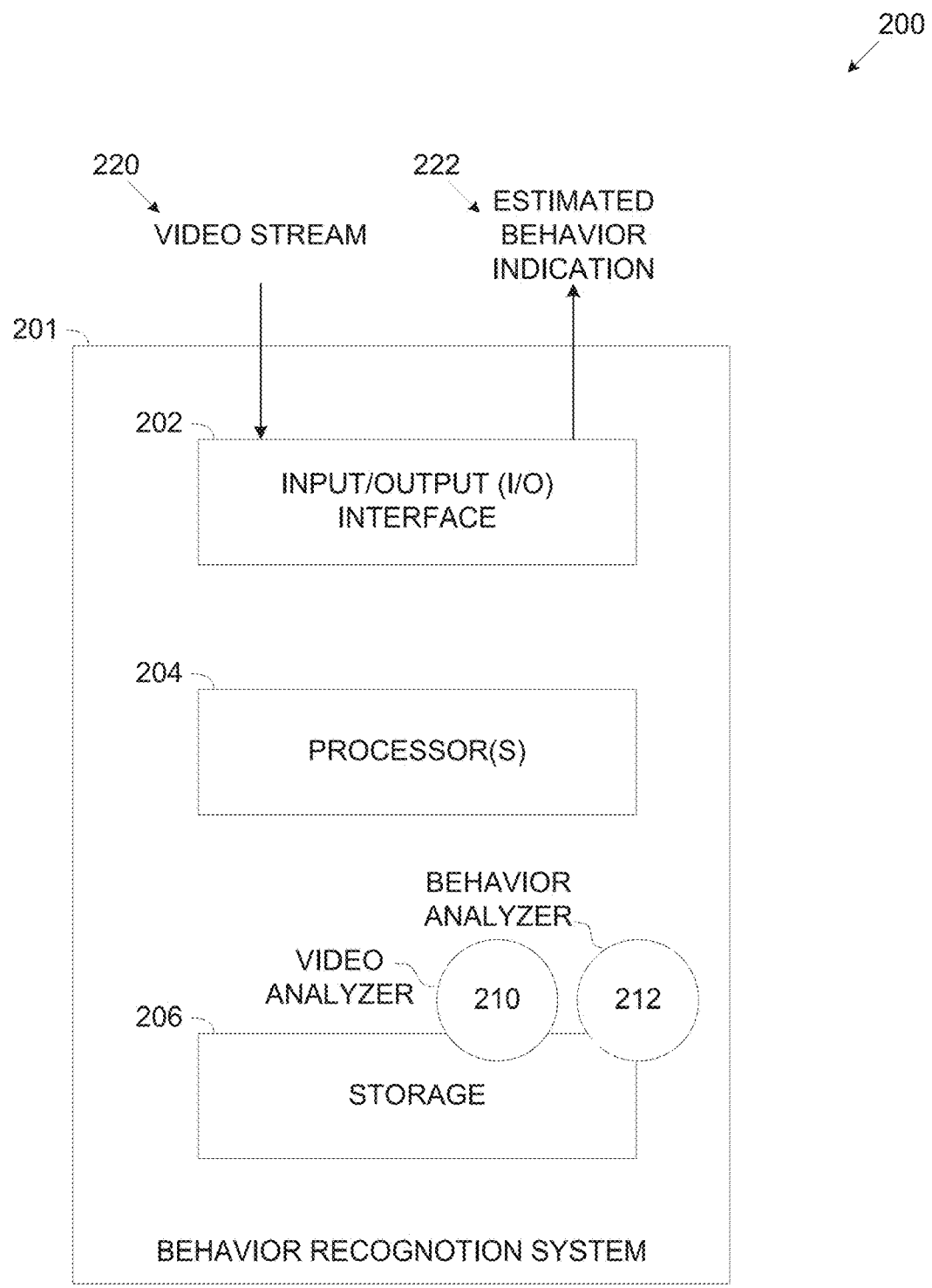
FIG. 2 is a schematic illustration of an exemplary system for recognizing behavior of one or more objects detected in a video stream, according to some embodiments of the present invention.

Reference is also made to FIG. 2, which is a schematic illustration of an exemplary system for recognizing behavior of one or more objects detected in a video stream, according to some embodiments of the present invention. An exemplary system 200 may include a behavior recognition system 201 comprising an input/output (I/O) interface 202, a processor(s) 204 for executing a process such as the process 100 and storage 206 for storing program code (serving as program store program store) and/or data.

The I/O interface 202 may include one or more interfaces for receiving, fetching and/or retrieving a video stream 220, a video stream, an H.264 stream, an MPEG stream, a motion JPEG stream and/or the like from one or more sources. For example, the I/O interface 202 may include one or more network interfaces for connecting to one or more wired and/or wireless networks, for example, a Local Area Network (LAN), a Wide Area Network (WAN), a Municipal Area Network (MAN), a cellular network, the internet and/or the like. As such the behavior recognition system 201 may receive the video stream 220 from one or more remote resources, for example, a network camera, a server, a storage server, a cloud service and/or the like. In another example, the I/O interface 202 may include one or more local interfaces, for example, a Universal Serial Bus (USB), a FireWire and/or the like for connecting to one or more local resources, for example, a camera, a local storage and/or the like to obtain the video stream 220.

The processor(s) 204, homogenous or heterogeneous, may include one or more processing nodes arranged for parallel processing, as clusters and/or as one or more multi core processor(s). The storage 206 may include one or more non-transitory memory devices, either persistent non-volatile devices, for example, a hard drive, a solid state drive (SSD), a magnetic disk, a Flash array and/or the like and/or volatile devices, for example, a Random Access Memory (RAM) device, a cache memory and/or the like.

The processor(s) 204 may execute one or more software modules, for example, a process, a script, an application, an agent, a utility, a tool and/or the like each comprising a plurality of program instructions stored in a non-transitory medium such as the storage 206 and executed by one or more processors such as the processor(s) 204. For example, the processor(s) 204 may execute a video analyzer module 210 for analyzing a video stream such as the video stream 220 to detect objects and associated attributes in the video stream 220 and/or a behavior analyzer module 212 for classifying actions and/or behavior of the detected objects. The behavior recognition system 201 may further output, through the I/O interface 202, an indication 222 of an estimated behavior recognized and/or classified for one or more objects detected in the video stream 220.

Optionally, the behavior recognition system 201, specifically the video analyzer 210 and/or the behavior analyzer 212 are provided by one or more cloud computing services, for example, Infrastructure as a Service (IaaS), Platform as a Service (PaaS), Software as a Service (SaaS) and/or the like such as, for example, Amazon Web Service (AWS), Google Cloud, Microsoft Azure and/or the like.

As shown at 102, the process 100 starts with the video analyzer 210 receiving the video stream 220 captured by one or more imaging sensors, for example, a camera, a video camera, an infrared (IR) camera, a thermal camera and/or the like. The video analyzer 210 may retrieve and/or receive the video stream 250 from a local and/or remote networked resource through the I/O interface 202.

As shown at 104, the video analyzer 210 applies a first set of trained classification functions (classifiers) comprising one or more classifiers adapted to visually analyze frames of the video stream 220 to identify one or more objects and one or more attributes associated with one or more of the objects. The objects may include, for example, a human, a group of humans, a vehicle, a group of vehicles, an animal, a group of animals and/or the like captured in the frames. As such the first set of trained classifiers may be designated Object Attribute Detector (OAD).

The video analyzer 210 may apply the first set of trained classifiers (OAD) to each frame in the video stream 220. However, optionally, the video analyzer 210 extracts a subset of selected frames from the video stream 220, for example, every $n^{th}$ frame and applies the first set of trained classifiers (OAD) to analyze the subset of frames. In another example, video analyzer 210 extracts a partial sequence of consecutive frames of interest from the video stream 220.

The visual classifier(s) of the first set of trained classifiers (OAD) may employ one or more machine learning probabilistic models, engines and/or algorithms, for example, a neural network, a support vector machine (SVM), a decision tree, a K-Nearest neighbors algorithm and/or any other learning algorithm trained as known in the art to create a visual classification model used to analyze newly presented frames. In particular, the visual classifier(s) employ one or more trained neural networks, for example, a CNN and/or the like.

The visual classifier(s) analyzing a frame may classify one or more objects detected in the frame to one or more predefined classes, categories and/or the like and calculate an object probability score for one or more objects detected in the frame. The object probability score indicates the probability (confidence) that the detected object is correctly classified.

The visual classifier(s) may further analyze the frame to identify and classify one or more attributes associated with one or more of the objects detected in the frame. The attributes may include, for example, one or more description attributes descriptive of the associated object, one or more action attributes indicative of an action conducted by the associated object, one or more interaction attributes indicative of an interaction between multiple objects and/or the like. The description attributes may include, for example, a gender, an age group, an ethnic group, height, build, cloth identification (e.g. type, color, etc.) and/or the like. The action attributes may include, for example, a pose, a gesture, limb(s) position and/or the like. The interaction attributes may include, for example, a respective pose between multiple objects, a contact between multiple objects, an interaction gesture between multiple objects, limb(s) position of one object with respect to other object(s) and/or the like. For each classified attribute, the visual classifier(s) may calculate an attribute probability score indicating the probability (confidence) that the detected attribute is correctly classified.

For example, assuming visual classifier(s) estimate with a certain probability that a certain object detected in the frame is a person (human), the visual classifier(s) may calculate the object probability score accordingly. Continuing this example, the visual classifier(s) may further estimate that the detected person is a male with a first probability score and a female with a second provability score. Further continuing this example, the visual classifier(s) may estimate that the detected person is wearing a black shirt with a first probability score, a grey shirt with a second probability score and a brown shirt with a third probability score. Further to this example, based on analysis of the pose of the detected person, the visual classifier(s) may estimate that the detected person is in a walking pose with a first probability score, in a running pose with a second probability score and in a standing pose with a third probability score.

In another example, assuming visual classifier(s) estimate with a certain probability that a certain object detected in the frame is a car (vehicle), the visual classifier(s) may calculate the object probability score accordingly. Continuing this example, the visual classifier(s) may further estimate that the detected car is blue with a first probability score, dark grey with a second probability score and black with a third probability score. Further to this example, the visual classifier(s) may estimate that a door of the detected car is open with a first probability score and closed with a second probability score.

The visual classifier(s) also associate each detected object with a location within the frame. Moreover, a bounding box may be assigned to each detected object in the frame which confines the detected object. The estimated location and/or bounding box may be expressed, for example, in coordinates mapping the respective object to an absolute location, a relative location and/or a combination thereof of the respective object in the frame. As such multiple objects may be tracked separately and/or in conjunction with other objects in the frames of the video stream 220 and/or part thereof, for example, the subset of frames extracted from the video stream 220.

Figure 3:
FIG. 3 is a capture of an exemplary video stream analyzed by visual classifiers to map objects detected in the video stream, according to some embodiments of the present invention.

Reference is now made to FIG. 3, which is a capture of an exemplary video stream analyzed by visual classifier(s) to map objects detected in the video stream, according to some embodiments of the present invention. An exemplary subset 300 of frames of a video stream such as the video stream 220 comprises exemplary frames 301A, 301B and 301C. The first set of classifiers, for example, the CNN analyzing the frame 301A may identify four objects in the frame 301A, a first person (human) 302, a second person (human) 304, a vehicle (car) 306 and a third person (human) 308. The first set of classifiers may further identify one or more attributes for the objects detected in the frame 301A. For example, the first person 302 may be associated with attributes such as, walking pose, hat, brown pants and/or the like. In another example, the second person 304 may be associated with attributes such as, near a door of the car 306, hat, black jacket and/or the like. In another example, the third person 308 may be associated with attributes such as, near a door of the car 306, grey jacket, black pants and/or the like. In another example, the car 306 may be associated with attributes such as, model, yellow color, license plate number, open driver side door and/or the like. As seen in the capture 300, the first set of classifiers may identify the location of each of the objects 302, 304, 306 and/or 308 in the frame 301A and may further assign a respective bounding box for each of the detected objects 302, 304, 306 and/or 308.

As described herein before, the first set of classifiers may assign a probability score for each of the detected objects 302, 304, 306 and/or 308 indicating the probability that the objects 302, 304 and/or 308 are indeed persons and the probability that the object 306 is indeed a car.

Reference is made once again to FIG. 1 and FIG. 2.

As shown at 106, the video analyzer 210 organizes the classification data provided by the first set of classifiers for an analyzed frame into a data structure describing the detected object(s), their associated attribute(s) and their location in the frame together with the probability scores calculated by the first set of classifiers for each object and its associated attribute(s). The collected classification data includes semantic elements such as linguistic (textual) expression for the classes, numeric expressions and/or values for the probability scores and numeric coordinates for the estimated location(s). The data structure created by the video analyzer 210 is therefore a semantic structure comprising the semantic elements. For example, the video analyzer 210 may organize the data provided by the first set of classifiers by creating a semantic attribute set for each object for each analyzed frame. The attribute set is a semantic structure, for example, a vector comprising a semantic description (e.g. text, expressions, symbols, coordinates, etc.) of the estimated class of the detected object together with the calculated object probability score, the attribute(s) associated with the object together with their respective calculated attribute probability score(s) and the location (e.g. bounding box) of the object.

In some embodiments, the detected object(s), their associated attribute(s) and the object(s) location are mapped to respective semantic attribute sets by dividing each of the analyzed frames to equally fixed size grid cells and mapping each cell to a respective attribute set. For example, the analyzed frame is divided to equally fixed size grid cells, for example, N×N grid cells and mapped to a respective tensor having dimensions of N×N×M, i.e. the tensor comprises N×N attribute sets where M is the total number of object classes and their respective attributes. For example, assuming the size of the frame is R×S pixels, the size of each grid cell is therefore R/N×S/N pixels. The bounding box assigned to each object detected in the frame may be used to map each object to its respective grid cell(s).

Figure 4:
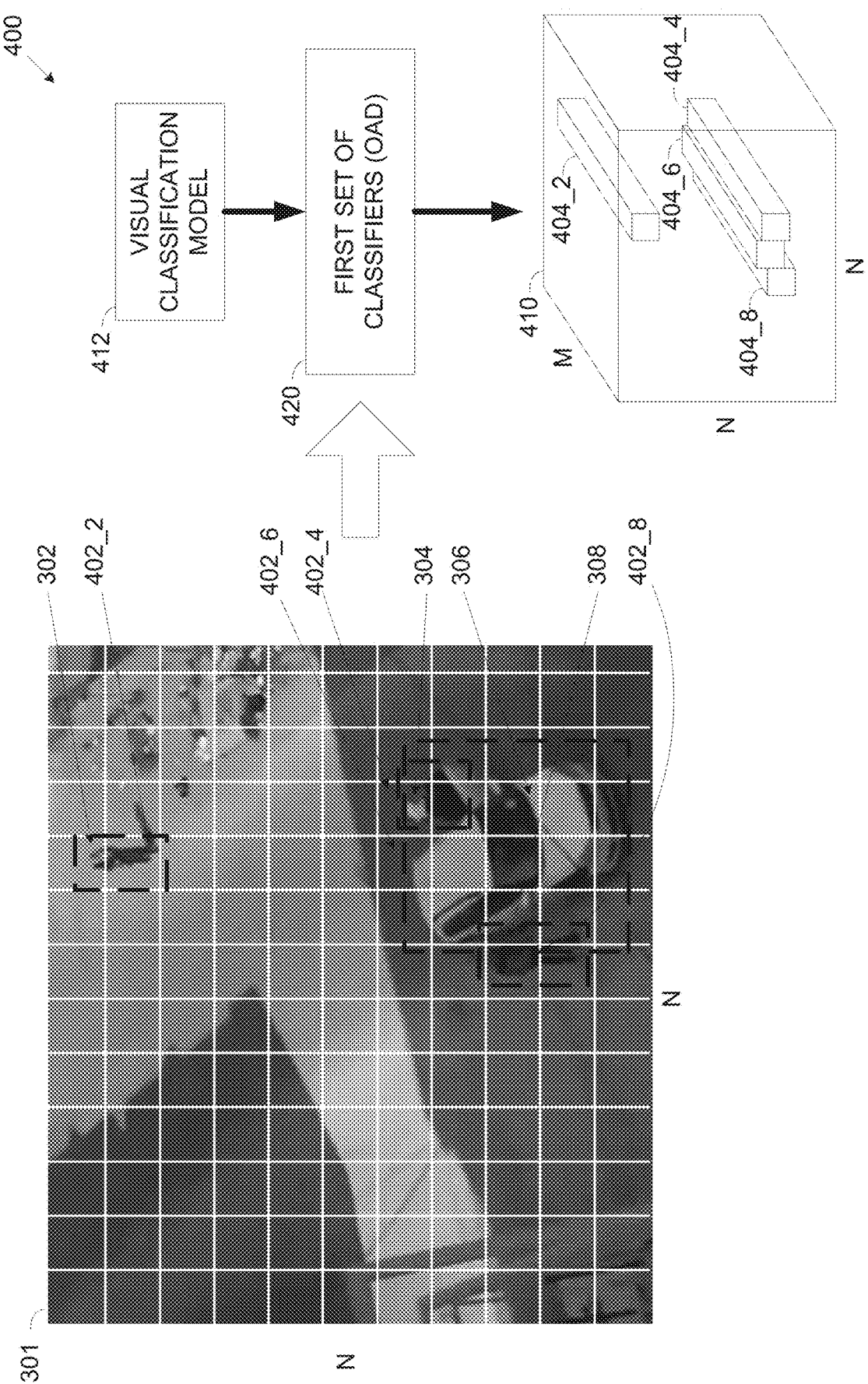
FIG. 4 is a block diagram of an exemplary process for creating attribute sets comprising attributes of objects detected in a video stream based on an analysis of visual classifiers, according to some embodiments of the present invention.

Reference is now made to FIG. 4, which is a block diagram of an exemplary process for creating attribute sets comprising attributes of objects detected in a video stream based on an analysis of visual classifier(s), according to some embodiments of the present invention. An exemplary process 400 may be executed by a video analyzer such as the video analyzer 210 to organize the data provided by the first set of classifiers analyzing a frame 301 of a video stream such as the video stream 220. The video analyzer 210 may use a first set of classifiers (OAD) 420, specifically the CNN trained as known in the art using a visual classification model 412 created using annotated training frames such as the frame 301. The video analyzer 210 may apply the trained CNN 420 to visually analyze the frame 301 to detect one or more objects in the frame 301, for example, the first person 302, the second person 304, the third person 308 and/or the car 306.

As shown, the video analyzer 210 may divide the frame 301 to a plurality of equally fixed size grid cells 402. The video analyzer 210 may create a plurality of attribute sets 404 such that each of the attribute sets 404 maps a respective one of the grid cells 402, for example, an attribute set 404_2 maps a grid cell 402_2, an attribute set 404_4 maps a grid cell 402_4, an attribute set 404_6 maps a grid cell 402_6 and an attribute set 404_2 maps a grid cell 402_8. Each object detected in the certain frame 301 and its associated attribute(s) may be described by one or more attribute sets 404 corresponding to the grid cells 402 in which the object is detected. Naturally, in case the bounding box of the detected object covers multiple grid cells 402, the object and its associated attribute(s) may be described in multiple attribute sets 404 corresponding to the grid cells 402 covered by the bounding box. In case a certain object is not detected in a specific cell 402, the attribute entries of this object will be left zero in the attribute set 404 corresponding to the specific cell 402. For example, the first person 302 and its associated attribute(s) may be described, among other attribute sets, in the attribute set 404_2 mapping the grid cell 402_2 in which the first person 302 is detected. In another example, the second person 304 and its associated attribute(s) may be described, among other attribute sets, in the attribute set 404_4 mapping the grid cell 402_4 in which the second person 304 is detected. In another example, the car 306 and its associated attribute(s) may be described, among other attribute sets, in the attribute set 404_6 mapping the grid cell 402_6 in which the car 306 is detected. In another example, the third person 308 and its associated attribute(s) may be described, among other attribute sets, in the attribute set 404_8 mapping the grid cell 402_8 in which the third person 308 is detected.

The video analyzer 210 may construct one or more data structures to store the attribute sets 404 created for each analyzed frame. For example, the attribute sets 404 may be mapped to elements of a tensor 410 corresponding to the grid cells of the analyzed frame 301 using a $3^{rd}$ dimension of the tensor 410. For example, assuming the frame 301 is divided to N×N grid cells, the dimensions of the tensor 410 may be set to N×N×M, such that the tensor 410 may include N×N attribute sets and M being the total number of object classes and their respective attributes. For example, assuming the attribute set 404_2 is associate with a grid cell ($X_i$, $Y_j$), i.e. the cell grid is located at position i on the horizontal axis (X) of the frame 301 and position j on the horizontal axis (Y) of the frame 301. The attribute set 404_2 is therefore mapped to an element ($X_i$, $Y_j$) of the tensor 410. Assuming the first person 302 is detected in grid cell ($X_i$, $Y_j$), the first person 302, its associated attributes and respective probability scores may be described in the attribute set 402_2.

The video analyzer 210 repeats the same process for each of the frames of the video stream 220 or the subset of selected frames to create a respective tensor 410 for each of the analyzed frames 301.

Reference is made once again to FIG. 1 and FIG. 2.

As shown at 108, the behavior analyzer 212 applies a second set of trained classification functions (classifiers) adapted to semantically analyze the attribute sets associated with each of one or more objects detected in the frames of the video stream 220 to classify one or more actions estimated to be conducted by the respective object. The actions may include, for example, a displacement of the respective object in space (in the frame), a motion of a part of the respective object, a gesture articulated by the respective object and/or the like. The second set of trained classifiers may calculate an action probability score for each estimated (classified) action.

The second set of trained classifiers may be further adapted to classify one or more interaction events estimated to be conducted by a plurality of objects detected in the frames. The second set of trained classifiers may calculate an event probability score for each estimated (classified) action.

The second set of trained classifiers may employ one or more machine learning probabilistic models, engines and/or algorithms, for example, a neural network, a support vector machine (SVM), a decision tree, a K-Nearest neighbors algorithm and/or any other learning algorithm trained as known in the art to create a visual classification model used to analyze newly presented frames. In particular, since the learning problem is a time-series analysis, the visual classifiers may employ time-series trained neural networks, for example, an LSTM RNN and/or the like.

As described herein before, the second set of trained classifiers, specifically the LSTM RNN is applied to the semantic attribute sets created by the video analyzer 210 for each object detected in a plurality of frames of the video stream 220 to semantically analyze and classify the attribute sets to one or more behavior type (class) corresponding to actions estimated to be conducted by the respective object(s). The LSTM RNN may calculate, for each action and its respective object, a behavior type probability score indicating the probability (confidence) that the estimated action(s) is correctly classified to the behavior type.

For example, based on the semantic analysis of a plurality of attribute sets created for a certain object in a plurality of frames, the LSTM RNN may classify an object estimated as a person to be walking with a first probability score, to be running with a second probability score and to be wandering about with a third probability score. In another example, the LSTM RNN may classify an object estimated as a person to be throwing an object with a first probability score, to be waving to someone with a second probability score and to be engaged in a physical training exercise with a third probability score. In another example, the LSTM RNN may classify with a certain probability score an object to be a person vandalizing property. In another example, the LSTM RNN may classify an object estimated as a car to be entering a parking space with a first probability score and to be exiting the parking space with a second probability score.

Moreover, the LSTM RNN may be applied to the semantic attribute sets created by the video analyzer 210 for multiple objects detected in a plurality of frames of the video stream 220 to semantically analyze and classify the attribute sets to one or more behavior type (class) corresponding to interaction events estimated to be conducted between the respective object(s). The LSTM RNN may calculate, for each event and its respective objects, a behavior type probability score indicating the probability (confidence) that the estimated interaction event is correctly classified to the behavior type.

For example, the LSTM RNN may classify an interaction event between two objects estimated as a person and a car as follows: the person normally entering the car is classified with a first probability score and the breaking into the car is classified with a second probability score. In another example, the LSTM RNN may classify an interaction event between two objects estimated as two persons as follows: the two persons holding hands is classified with a first probability score and the two persons fighting each other is classified with a second probability score. In another example, the LSTM RNN may classify an interaction event between two objects estimated as two persons as follows: the two persons kissing is classified with a first probability score and one person sexually harassing the other person is classified with a second probability score. In another example, the LSTM RNN may classify an interaction event between two objects estimated as two to be a car accident with a certain first probability score.

It is important to emphasize that the LSTM RNN may classify multiple actions and/or events estimated to be conducted by multiple objects detected in the frames of the video stream 220 and described by the respective semantic attribute sets.

The second set of trained classifiers, for example, the LSTM RNN may be trained with a training dataset comprising a plurality of annotated training samples. Each training samples may include a group of training attribute sets labeled with respective action(s) and/or event(s) expressed by the group of training attribute sets. The LSTM RNN may be trained is trained with the training dataset to form a behavior recognition model according to which the weights of the LSTM RNN may be adjusted to accurately classify the training samples attribute sets to match their assigned labels.

The training dataset may include a plurality of training samples each comprising training attribute sets created by the video analyzer 210 by analyzing real video stream(s) 220 and annotated with a label associated with the training attribute sets which describes the action(s) and/or event(s) conducted by the object(s) in the video stream(s) 220.

For example, assuming the attribute sets are organized in the tensors 410 created by the video analyzer 210 based on the visual analysis of the first set of classifiers (OAD) 420 applied to an annotated (labeled) training video sample. Each of the tensors 410 corresponds to a respective frame of the training video sample and may therefore be annotated with one or more labels designating the action(s) and/or event(s) conducted by the object(s) depicted in the respective frame of the training sample. A plurality of windows (segments) may be extracted at a plurality of location of each of the tensors 410 where the size of each window may be set to K×K×M. The window size K may be selected empirically by testing different window sizes and selecting the window size presenting best performance, for example, lowest classification error for one or more validation (training) datasets. The LSTM RNN applied to the plurality of extracted windows each labeled accordingly may adjusts its weights to accurately classify each of the windows to match its assigned label. The training process may be repeated iteratively for all the windows extracted from the tensors 410 where the location of the training sequences the training sequences, consisting of a window extracted from tensor 410 in the same location in successive frames and presented to the LSTM RNN may be randomly selected at each of the iterations. Determining the window size K may therefore be done by applying the LSTM RNN to a sequence of windows with different window sizes K×K×M extracted from the same location in the tensor 410 (corresponding to a certain location in the respective annotated frame) and selecting the window size K that presents best classification results, i.e. best compliance with the label(s) of the annotated frames from which the tensors 410 are derived.

Optionally, the training data set comprises one or more augmented training samples. Each augmented training sample may include a group of training attribute sets where one or more of the training attribute sets are augmented such that one or more of the elements of each augmented training attribute set is altered. Where the elements of the training attribute sets comprise the object class and object probability score, one or more attributes associated with the object and their respective attribute probability score and/or the location (bounding box) of the object. For example, one or more of the elements of the augmented training attribute set may be altered by injecting white noise to training samples comprising training attribute sets created by the video analyzer 210 by analyzing real video stream(s) 220. In another example, one or more of the frames of one or more of the augmented training sample may be randomly shifted along both image dimensions. Augmenting the training samples results in creating multiple training augmented samples from a single real training sample where each of the training augmented samples is slightly changed from the real training sample it is derived from.

Figure 5:
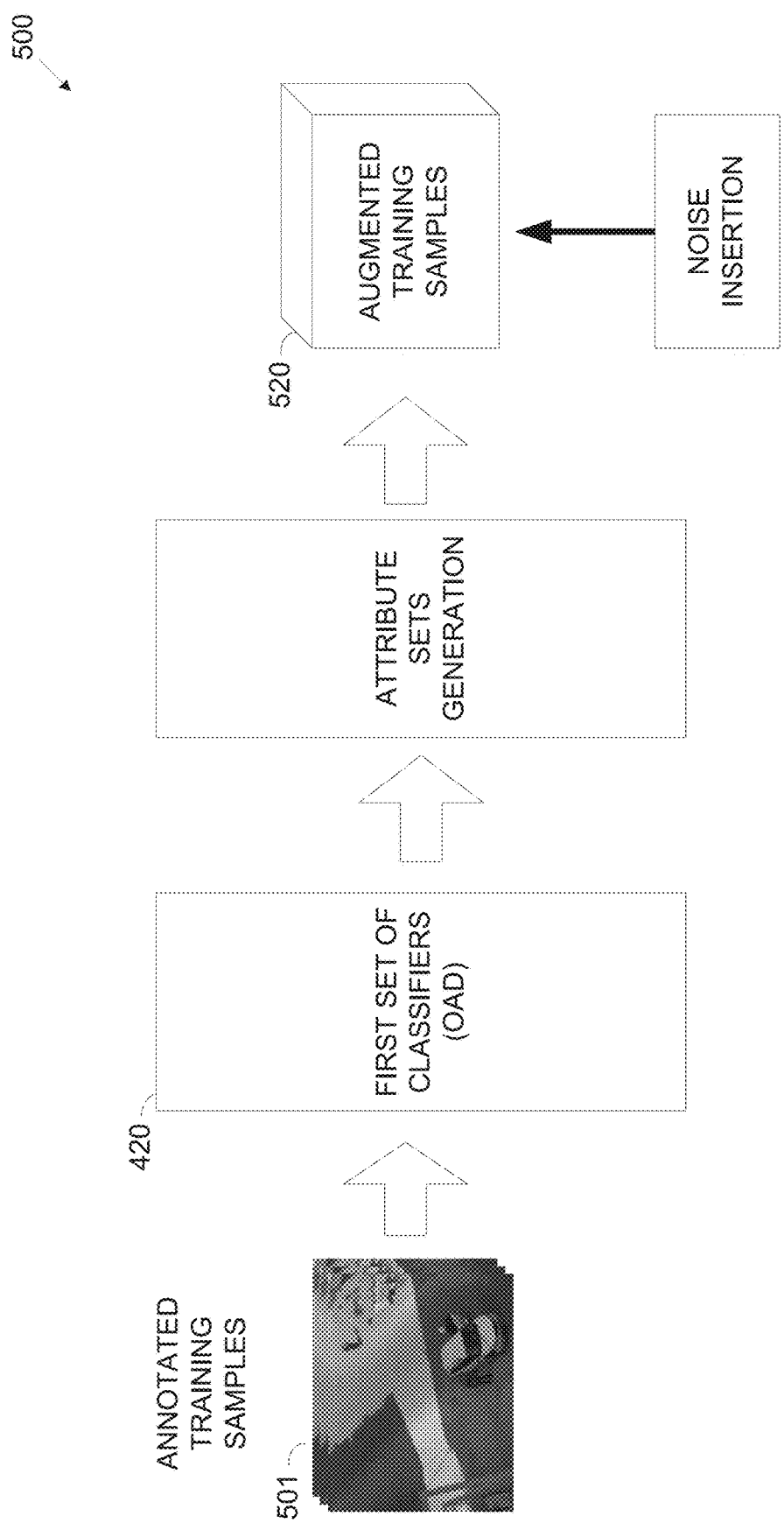
FIG. 5 is a block diagram of an exemplary process of creating augmented training samples, according to some embodiments of the present invention.

Reference is now made to FIG. 5, which is a block diagram of an exemplary process of creating augmented training samples, according to some embodiments of the present invention. An exemplary process 500 may be executed by a video analyzer such as the video analyzer 210 and a behavior analyzer such as the behavior analyzer 212 to create one or more augmented training samples 520. The video analyzer 210 may receive one or more annotated (labeled) training samples 501 (frames) and apply a first set of classifiers such as the first set of classifiers (OAD) 420 to extract detect one or more objects, attribute(s) associated with the detected object(s) and an estimated location of the detected object(s). The video analyzer 210 may then create an attribute set for each detected object comprises the detected object and its calculated object probability score, the associated attribute(s) and their calculated attribute probability score(s) and the estimated location in the frame. The video analyzer 210 further annotates each of the attribute sets with the label of the respective training samples 501 frame(s) such that. For example, the video analyzer 210 may create tensors such as the tensors 410 each associated with a respective one of the plurality of analyzed annotated frames 501 and containing a plurality of semantic attribute sets created for the respective annotated frame 501.

The behavior analyzer 212 may insert white noise to alter one or more elements of one or more of the attribute sets 402_2, 402_4, 402_6 and/or 402_8 to create respective augmented training samples 520. For example, the behavior analyzer 212 may insert white noise 502 to alter the object probability score calculated for one the object associated with certain attribute set(s) 402. In another example, the behavior analyzer 212 may insert white noise 502 to alter one or more attribute probability scores calculated for attribute(s) estimated for the object associated with certain attribute set(s) 402. In another example, the behavior analyzer 212 may insert white noise 502 to alter a location, i.e. the bounding box of the object associated with certain attribute set(s) 402.

Each augmented training sample 520 is assigned (annotated) with the same label of its respective annotated training sample from which it is derived.

Including the augmented training samples 520 in the training dataset may significantly increase and/or diversify the training dataset used for training the second set of trained classifiers, specifically the LSTM RNN thus improving classification performance, accuracy and/or speed.

Optionally, the training data set comprises one or more synthetic training samples. Each synthetic training sample may include a plurality of data structures, for example, tensors 410 each created to simulate objects detection in a respective frame of a simulated video stream such as the video stream 220 and/or a part thereof. Each data structure such as the tensor 410 may include a plurality of attribute sets created to map object(s) simulated in a respective simulated frame together with an assigned object probability score, one or more attributes associated with the simulated object assigned with respective attribute probability score(s) and a location of the simulated object(s) in the respective simulated frame.

The synthetic training samples may be created by a synthetic scenario generator module executed by the processor(s) 204. The synthetic scenario generator may take as input a semantic (e.g. verbal, symbolic, etc.) description of one or more actions conducted by a simulated object and/or of one or more events of interaction between multiple simulated objects and creating respective simulated data structures, for example, simulated tensors each comprising a plurality of simulated attribute sets. The event description may be created manually and/or automatically using one or more 2 dimensions (2D) and/or 3 dimensions (3D) projection methods. The event description may be created as follows:

a) Define a setup including a 3D scene (box) with static objects (e.g. buildings, poles, trees, etc.) located in predefined 3D locations.

b) Define camera parameters, for example, location, viewpoint, field of view, angle and/or the like. These parameters define the 3D to 2D projection model, i.e. how an object located at 3D coordinated (X, Y, Z) with dimensions W×H×D (width, height, depth) is seen in a 2D image taken by the camera using a standard transformation.

c) Define moving objects of interest (e.g. people, vehicle(s) such as car(s), motorcycle(s), etc.). For each object, define location(s), time of appearance, trajectory and associated attribute(s). For example, a person appears at time $T_1$, in location $(X_1, Y_1, Z_1)$, walking toward location $(X_2, Y_2, Z_2)$, wearing black upper clothes and holding a bag.

The synthetic scenario generator may first parse the event description which may describe, for example, one or more simulated objects, starting and ending positions and/or locations of the simulated object(s), direction of movement (if moving), a set of attributes associated with the object(s) and/or the like. Based on the information defined in the event description, the synthetic scenario generator may calculate the 3D coordinates for each object in each time instance. By transforming the object(s)' 3D locations and sizes to 2D image coordinates, the synthetic scenario generator may locate the object(s) in each simulated frame depicting the simulated scenario. The synthetic scenario generator may further associate one or more of the simulated objects with one or more attributes as defined by the parsed description. It should be noted that the synthetic scenario generator does not create actual frames having real visual data but rather creates the semantic attribute sets which correspond to the parsed description used for simulating the respective frame. In the process of creating the synthetic semantic attribute sets, the synthetic scenario generator may add and/or exclude one or more randomly selected objects. The synthetic scenario generator may further select and associate one or more attributes unspecified for one or more of the simulated objects.

After creating the semantic attribute sets for the simulated object(s), the synthetic scenario generator may assign each of the object(s), each of its associated attribute(s) and its location(s) (e.g. bounding box) in the simulated frame with probability scores as done by the first set of visual classifiers. In order to achieve realistic values, the synthetic scenario generator may assign values to the probability scores, e.g. the object probability score(s), the attribute probability score(s) and the location (bounding box) according to realistic distribution values defined in advance for each of the objects and attributes.

The distribution values may be derived from statistical analysis of classification results of one or more visual classifiers such as the first set of trained visual classifier(s) (OAD). Moreover, the object probability score assigned to each simulated object and/or the attribute probability score(s) assigned to the associated attribute(s) may be defined according to statistics measured for the first set of classifiers (OAD) 420 applied to similar type of images depicting similar object(s) as the simulated object(s). For example, the distribution values used for assigning the object probability score(s), the attribute probability score(s)

and the bounding box for correct and wrong classifications (detections) may be calculated from running the first set of trained visual classifier(s) (OAD)OAD on an annotated training dataset and fitting the distribution for the following parameters:

Visual classifier(s) (OAD) confidences for correct classifications (detections) for each object and associated attribute(s) conditional on object size.

Visual classifier(s) (OAD) confidences and identified bounding boxes for wrong classifications (detections) for each object and associated attribute(s).

Visual classifier(s) (OAD) predicted bounding box deviation for correct classifications (detections) for each object type.

(Optional) Visual classifier(s) (OAD) objects and/or attributes confidences deviation between successive and/or each $n^{th}$ frames for correct classifications (detections).

(Optional) Visual classifier(s) (OAD) objects and/or attributes confidences deviation between successive and/or each $n^{th}$ frames for wrong classifications (detections).

Creating the synthetic training samples may be extremely fast, compared to the alternative of finding/creating an actual video stream depicting action(s) and/or event(s) and annotating the video. This is since the synthetic training samples are created entirely in the semantic domain which may require insignificant effort for creating, annotating, adjusting manipulating and/or the like compared to using real video streams as may be done by the existing methods and systems.

Including the synthetic training samples 620 in the training dataset may further increase and/or diversify the training dataset used for training the second set of trained classifiers, specifically the LSTM RNN thus improving classification performance, accuracy and/or speed.

Figure 6:
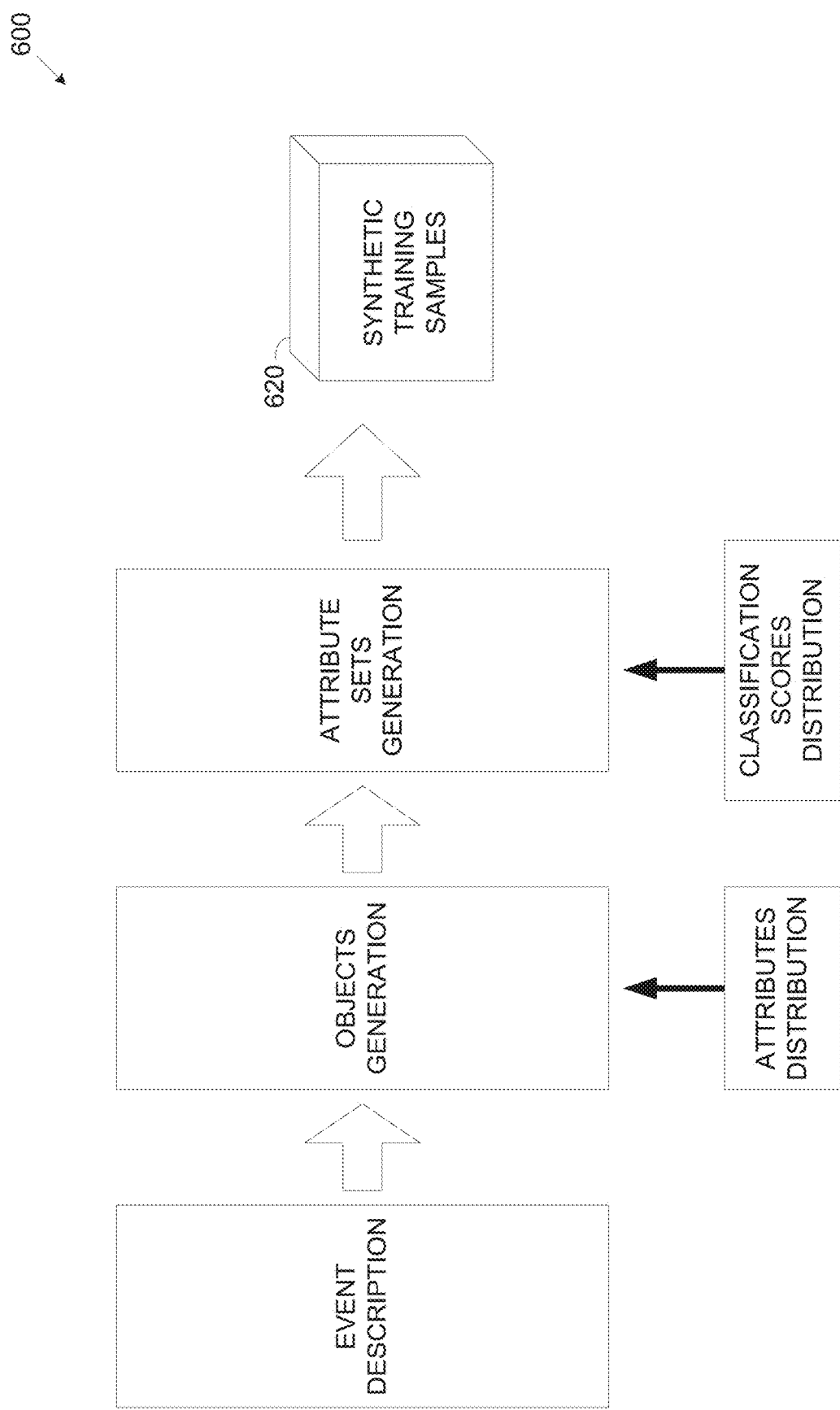
FIG. 6 is a block diagram of an exemplary process of creating synthetic training samples, according to some embodiments of the present invention.

Reference is now made to FIG. 6, which a block diagram of an exemplary process of creating synthetic training samples, according to some embodiments of the present invention. An exemplary process 600 may be executed by a behavior analyzer such as the behavior analyzer 212 to create one or more synthetic training samples 620. The behavior analyzer 212 may receive one or more annotated semantic event description each assigned with a respective label associated with action(s) and/or event(s) portrayed by the respective event description. The behavior analyzer 212 may create one or more simulated objects according to the event description and may further associate each of the simulated object(s) with one or more attributes according to the event description. The behavior analyzer 212 may further associate one or more of the object(s) with additional attributes not specified by the event description. The behavior analyzer 212 may assign values to the object probability score and to the attribute probability score(s) according to the realistic distribution values predefined for each of the objects and attributes.

The behavior analyzer 212 may then create the attribute sets for one or more of the simulated objects for each of a plurality of simulated frames corresponding to the event description. The behavior analyzer 212 may further adjust the attribute sets, specifically the object probability score(s), the attribute probability score(s) and/or the estimated location (bounding box) according to the distribution (deviation) values measured for the first set of classifiers (OAD) 420. Doing so will result in significantly more realistic synthetic training samples 620 since they may emulate the classification as executed by the first set of classifiers (OAD) 420 on real world video samples.

The second set of trained classifiers, for example, the LSTM RNN may be trained with a training dataset comprising a plurality of annotated training samples. Each training samples may include a group of training attribute sets labeled with respective action(s) and/or event(s) expressed by the group of training attribute sets. The LSTM RNN may be trained with the training dataset to form a behavior recognition model according to which the weights of the LSTM RNN may be adjusted to accurately classify the training samples attribute sets to match their assigned labels.

Figure 7:
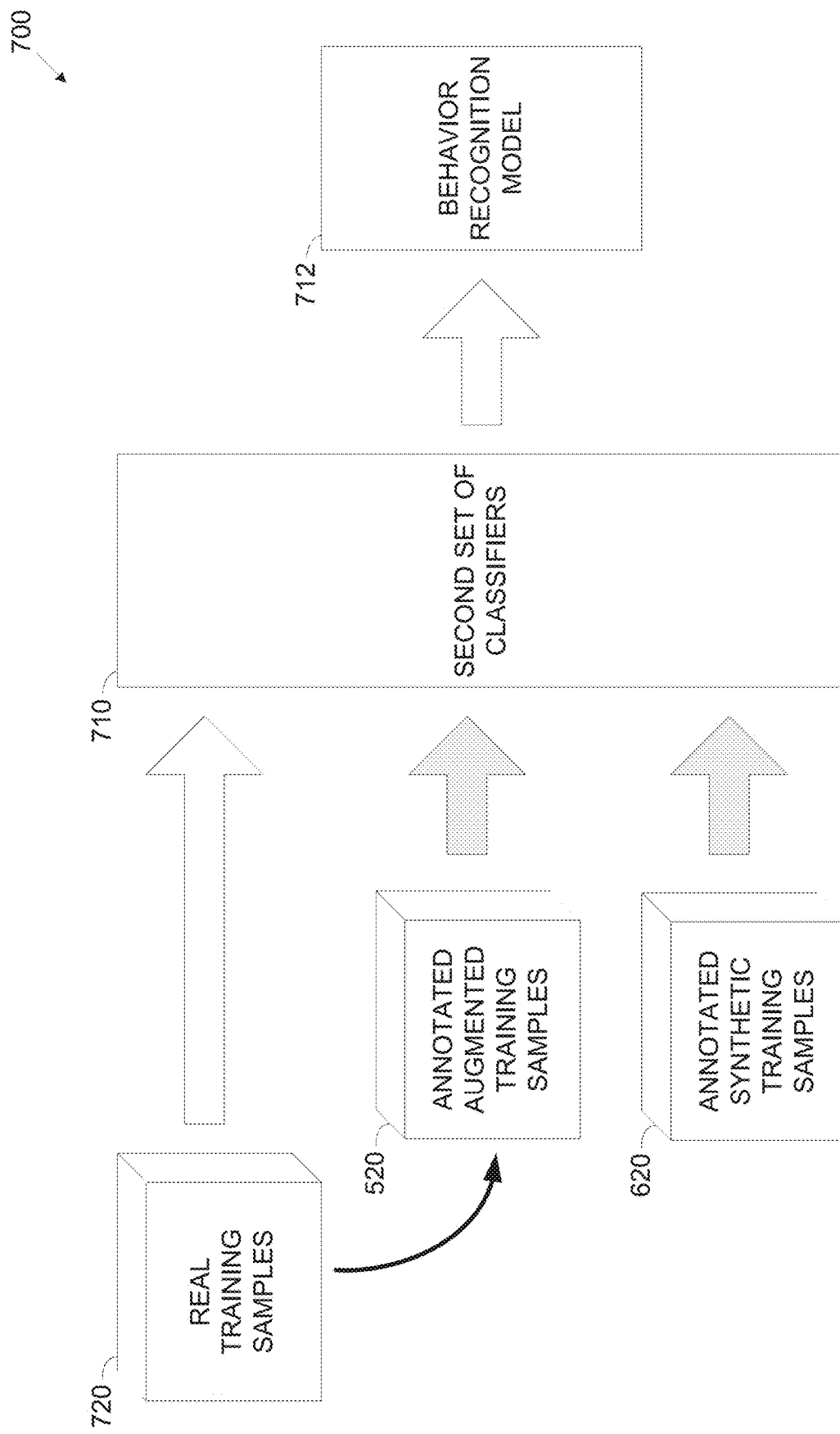
FIG. 7 is a block diagram of an exemplary process of training classifiers using real, augmented and synthetic training samples, according to some embodiments of the present invention.

Reference is now made to FIG. 7, which is a block diagram of an exemplary process of training classifiers using real, augmented and synthetic training samples, according to some embodiments of the present invention. An exemplary process 700 may be executed by a behavior analyzer such as the behavior analyzer 212 to train the second set of classifiers, for example, the LSTM RNN using real training samples 720, augmented training samples such as the augmented training samples 520 and/or synthetic training samples such as the synthetic training samples 620.

The training dataset may include a plurality of real training samples 720 each comprising training attribute sets created by the video analyzer 210 analyzing frames of one or more real video streams such as the video stream(s) 220 and annotated with labels associated with the training attribute sets and identifying the action(s) and/or event(s) conducted by the object(s) depicted in the video stream(s) 220.

The training dataset may further include a plurality of the augmented training samples 520 comprising augmented training attribute datasets created from one or more of the real training samples 720 as described in the process 500. The training dataset may also include a plurality of the synthetic training samples 520 comprising simulated training attribute datasets created as described in the process 600.

Trained as described in step 108 of the process 100 with the plurality of annotated real training samples 720, augmented training samples 520 and synthetic training samples 620, a behavior recognition model 712 may be created according to which the weights of the LSTM RNN may be adjusted to accurately classify the annotated attribute sets to match their assigned labels.

Figure 8:
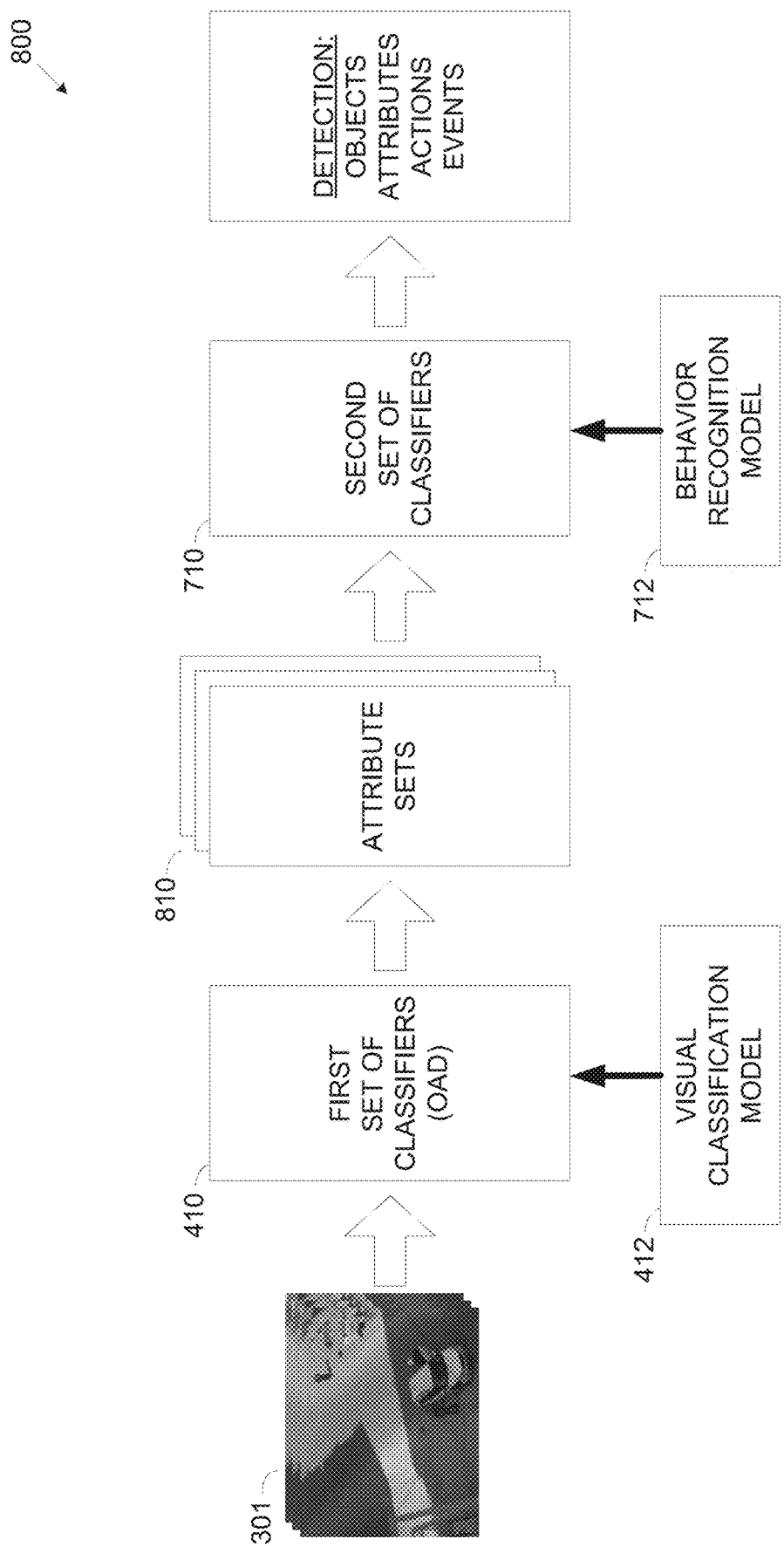
FIG. 8 is a block diagram of an exemplary process of using trained classifiers to recognize behavior of objects detected in a video stream, according to some embodiments of the present invention.

Reference is now made to FIG. 8, which is a block diagram of an exemplary process of using trained classifiers to recognize behavior of objects detected in a video stream, according to some embodiments of the present invention. An exemplary process 800 may be executed by applying trained classifiers to estimate a behavior type of action(s) and/or interaction event(s) estimated to be conducted by one or more objects detected in a real video stream such as the video stream 220 which is new and unknown and naturally not labeled.

As described in the process 100, a video analyzer such as a video analyzer 210 may apply a first set of classifiers (OAD) such as the first set of classifiers (OAD) 420 trained according to a visual classification model 412 as known in the art, to visually analyze a plurality of frames such as the frames 301 of the video stream 220. The visual classifiers 420 may detect one or more objects in each analyzed frame and classify them accordingly with an object probability score. The visual classifiers 420 may further identify one or more attributes associated with one or more of the detected object(s) and classify them accordingly with respective attribute probability score(s). The visual classifiers 420 may also estimate a location of the detected object(s) in the respective frame 301.

The video analyzer 210 creates semantic attribute sets 810 for one or more of the objects detected in each analyzed frame 301 where each attribute set corresponds to a respective frame 310. The attribute sets 810 include the class(es) estimated for the respective object, the object probability score(s) assigned to the estimated class(es), the class(es) estimated for the attributes identified as associated with the respective object, the attribute probability score assigned to each of the estimated attributes and the estimated location in the respective frame 310.

A behavior analyzer such as a behavior analyzer 212 may apply a trained second set of classifiers 710, for example, the LSTM RNN trained according to a behavior recognition model such as the behavior recognition model 712, to the attribute sets 810 to estimate a behavior type (class) of one or more actions and/or interaction events conducted by one or more of the detected objects as expressed by the respective attribute sets 810.

The detection and classification of the actions and/or events may be done very similarly to the method employed for training the LSTM RNN 710 with the exception that the attribute sets 810 are naturally not annotated (labeled). For example, assuming the attribute sets 810 are organized in the tensors 410 created by the video analyzer 210 based on the visual analysis of the first set of classifiers (OAD) 420. As described for the training process, each of the tensors 410 corresponds to a respective frame 301 of the video stream 220 or the subset of frames selected from the video stream 220. A plurality of windows (sections) may be extracted at a plurality of location of each of the tensors 410 where the size of each window may be set to K×K×M. The LSTM RNN 710 is applied to the extracted windows together with the frame identifiers to provide timing context to the LSTM RNN 710. Based on the analysis of the plurality of windows each comprising a group of the attribute sets 810 of the tensor 410, the LSTM RNN 710 may estimate a behavior type (class) for one or more actions estimated to be conducted by a respective detected object or for one or roe interaction events estimated to be conducted by multiple detected objects. The LSTM RNN 710 further calculates a behavior type probability score for each estimated behavior type.

The classification results of the plurality of windows may be aggregated to provide classification of objects, attributes, actions and/or events detected in the complete tensor 410 corresponding to the complete frame 310. The LSTM RNN 710 may output the classified detections, i.e. the detected objects, attributes, action(s) and/or event(s) including their respective probability scores.

Reference is made once again to FIG. 1 and FIG. 2.

As shown at 110, the behavior analyzer 212 may output an indication 222 of the behavior type of the action(s) and/or event(s) estimated to be conducted by one or more objects detected in the frames of the video stream 220. In particular, the behavior analyzer 212 may output an indication 222 in case the classified behavior type(s) comply with one or more predefined rules. Optionally the behavior analyzer 212 also outputs the classified behavior type(s), action(s), event(s), objects and/or attribute(s). The behavior analyzer 212 may further instruct storing the video stream 220 and/or part thereof in case the classified behavior type(s) complies with one or more of the predefined rules.

For example, assuming the behavior recognition system 201 executing the process 100 is utilized by a security system deployed with one or more cameras monitoring a certain area. In such case one or more of the predefined rules may dictate, for example, that an indication is generated in case a car theft behavior type is estimated with a behavior type probability score exceeding a certain threshold. The system may further transmit the indication, optionally with the estimated behavior and/or an indication of the classified objects, actions, events and/or the like to one or more destinations, for example, the police, a security service operation center and/or the like. The relevant video stream 220 may also be stored in such case.

In another example, assuming the behavior recognition system 201 executing the process 100 is utilized by a transportation emergency service system deployed with one or more cameras monitoring a certain street, road and/or the like. In such case one or more of the predefined rules may dictate that an indication is generated in case a car accident behavior type is estimated with a behavior type probability score exceeding a certain threshold. The system may further transmit the indication, optionally with the estimated behavior and/or an indication of the classified objects, actions, events and/or the like to one or more destinations, for example, the police, a medical service and/or the like. The relevant video stream 220 may also be stored in such case.

In another example, assuming the behavior recognition system 201 executing the process 100 is utilized by a public order monitoring system deployed with one or more cameras monitoring a certain area. In such case one or more of the predefined rules may dictate that an indication is generated in case a fight between people behavior type is estimated with a behavior type probability score exceeding a certain threshold. The system may further transmit the indication, optionally with the estimated behavior and/or an indication of the classified objects, actions, events and/or the like to one or more destinations, for example, the police, a medical service and/or the like. The relevant video stream 220 may also be stored in such case.

It is expected that during the life of a patent maturing from this application many relevant systems, methods and computer programs will be developed and the scope of the terms visual classifier, semantic classifier and/or classification machine learning algorithms are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A computer implemented method of identifying a behavior of objects detected in a video stream, comprising:
   using at least one processor adapted for:
      receiving a video stream comprising a plurality of frames captured by at least one imaging sensor;
      applying a first set of trained classification functions for visually analyzing each of at least a subset of the plurality of frames to create a respective one of a plurality of semantic attribute sets for at least one object detected in a respective frame, the respective attribute set comprising an object probability score indicative of a probability of a class of the at least one object, an attribute probability score indicative of a probability of at least one of a plurality of attributes associated with the at least one object and an estimated location of the at least one object in the respective frame;
      applying a second set of trained classification functions for semantically analyzing the plurality of attribute sets created for the at least one object tracked in the subset of frames to calculate a behavior type probability score indicative of at least one of a plurality of actions estimated to be conducted by the at least one object; and
      outputting an indication in case the calculated behavior type probability score complies with at least one predefined rule.

2. The computer implemented method of claim 1, wherein each frame of the subset is divided to a plurality fixed size cells, the at least one object is tracked in the subset of frames by mapping each of the plurality of attribute sets to at least one corresponding cell of the plurality fixed size cells according to the estimated location of the at least one object in the respective frame.

3. The computer implemented method of claim 1, wherein the at least one object is a member of a group consisting of: a human, a group of humans, an animal, a group of animals, a vehicle and a group of vehicles.

4. The computer implemented method of claim 1, wherein each of the plurality of attributes associated with the at least one object is a member of a group consisting of: a description attribute, an action attribute and an interaction attribute.

5. The computer implemented method of claim 1, wherein the plurality of actions includes at least one member of a group consisting of: a displacement of the at least one object in space, a motion of a part of the at least one object and a gesture articulated by the at least one object.

6. The computer implemented method of claim 1, further comprising applying the second set of trained classification functions to calculate an event type probability score for at least one estimated interaction event of the at least one object with at least one another object.

7. The computer implemented method of claim 1, wherein the first set of trained classification functions comprises at least one convolutional neural network (CNN) organized with hierarchical classes.

8. The computer implemented method of claim 1, wherein the second set of trained classification functions comprises at least one long short term (LSTM) recurrent neural network (RNN).

9. The computer implemented method of claim 1, wherein the second set of trained classification functions is trained using a training dataset comprising a plurality of samples generated by the first set of trained classification functions, each of the plurality of samples comprising a group of training attribute sets associated with a label indicating a certain one of the plurality of actions expressed by the group of training attribute sets.

10. The computer implemented method of claim 9, further comprising including at least one augmented sample in the training dataset, the at least one augmented sample is created by altering at least one element of one of the plurality of samples, the at least one altered element is a member of a group consisting of: the object probability score, the attribute probability score and the estimated location.

11. The computer implemented method of claim 9, further comprising including at least one synthetic sample in the training dataset, the at least one synthetic sample is created by assigning a value to each of the elements of a group of training attribute sets created for the at least one simulated object simulated in a group of frames used for training the second set of trained classification functions.

12. The computer implemented method of claim 11, wherein the value is assigned according to a distribution value indicative of a level of association of a respective element of a respective attribute set with a certain one of the plurality of actions in real world.

13. A system for identifying a behavior of objects detected in a video stream, comprising:
   a program store storing a code; and
   at least one processor coupled to the program store for executing the stored code, the code comprising:
      code instructions to receive a video stream comprising a plurality of frames captured by at least one imaging sensor;
      code instructions to apply a first set of trained classification functions for visually analyzing each of at least a subset of the plurality of frames to create a respective one of a plurality of semantic attribute sets for at least one object detected in a respective frame, the respective attribute set comprising an object probability score indicative of a probability of a class of the at least one object, an attribute probability score indicative of a probability of at least one of a plurality of attributes associated with the at least one object and an estimated location of the at least one object in the respective frame;
      code instructions to apply a second set of trained classification functions for semantically analyzing the plurality of attribute sets created for the at least one object tracked in the subset of frames to calculate a behavior type probability score indicative of at least one of a plurality of actions estimated to be conducted by the at least one object; and code instructions to output an indication in case the calculated behavior type probability score complies with at least one predefined rule.

\* \* \* \* \*